(12) United States Patent
Kim et al.

(10) Patent No.: US 10,241,541 B2
(45) Date of Patent: Mar. 26, 2019

(54) WEARABLE DEVICE, MASTER DEVICE OPERATING WITH THE WEARABLE DEVICE, AND CONTROL METHOD FOR WEARABLE DEVICE

(71) Applicant: SAMSUNG ELECTRONICS CO., LTD., Suwon-si (KR)

(72) Inventors: Young-jae Kim, Seoul (KR); Seong-il Hahm, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/996,052

(22) Filed: Jun. 1, 2018

(65) Prior Publication Data
US 2018/0275716 A1    Sep. 27, 2018

Related U.S. Application Data

(62) Division of application No. 14/688,431, filed on Apr. 16, 2015, now Pat. No. 9,989,996.

(30) Foreign Application Priority Data

Apr. 16, 2014 (KR) .................. 10-2014-0045495

(51) Int. Cl.
G06F 3/01 (2006.01)
G06F 1/16 (2006.01)
(Continued)

(52) U.S. Cl.
CPC ............ *G06F 1/163* (2013.01); *G06F 1/1694* (2013.01); *G06F 1/3231* (2013.01); *G06F 1/3265* (2013.01); *G06F 1/3278* (2013.01); *G06F 1/3287* (2013.01); *G06F 3/017* (2013.01); *H04W 52/0254* (2013.01);
(Continued)

(58) Field of Classification Search
CPC ...... G06F 1/163; G06F 1/3278; G06F 1/3265; G06F 3/017; G06F 1/3287; G06F 1/3231; G06F 1/1694; G06F 2200/1637; G06F 3/014; H04W 52/0254; H04W 52/0245; H04W 52/027; Y02D 70/146; Y02D 70/142; Y02D 10/173; Y02D 70/144; Y02D 70/26; Y02D 10/171; Y02D 70/166
See application file for complete search history.

(56) References Cited

U.S. PATENT DOCUMENTS 5,612,931 A    3/1997  Sato et al.
6,452,494 B1   9/2002  Harrison
(Continued)

FOREIGN PATENT DOCUMENTS

CN      103713740 A       4/2014
KR   10-2013-0047474 A    5/2013
WO     2012024030 A1      2/2012

OTHER PUBLICATIONS

Communication dated Mar. 28, 2018, issued by the European Patent Office in counterpart European Application No. 15779356.3.
(Continued)

Primary Examiner — Rodney Amadiz
(74) Attorney, Agent, or Firm — Sughrue Mion, PLLC

(57) ABSTRACT

Provided is a wearable device that is wearable on a body of a user, the wearable device including a display configured to display a screen; a sensor configured to sense a motion of the user; and a controller configured to control the display based on the sensed motion.

18 Claims, 10 Drawing Sheets

(51) Int. Cl.
  *G06F 1/3231* (2019.01)
  *G06F 1/3234* (2019.01)
  *G06F 1/3287* (2019.01)
  *H04W 52/02* (2009.01)

(52) U.S. Cl.
  CPC ... *G06F 2200/1637* (2013.01); *H04W 52/027* (2013.01); *H04W 52/0229* (2013.01); *H04W 52/0245* (2013.01); *Y02D 10/153* (2018.01); *Y02D 10/171* (2018.01); *Y02D 10/173* (2018.01); *Y02D 70/1262* (2018.01); *Y02D 70/142* (2018.01); *Y02D 70/144* (2018.01); *Y02D 70/146* (2018.01); *Y02D 70/166* (2018.01); *Y02D 70/26* (2018.01)

(56) References Cited

U.S. PATENT DOCUMENTS

| | | |
|---|---|---|
| 6,809,724 B1 | 10/2004 | Shiraishi et al. |
| 2004/0243342 A1 | 12/2004 | Rekimoto |
| 2007/0208544 A1 | 9/2007 | Kulach et al. |
| 2009/0195497 A1 | 8/2009 | Fitzgerald et al. |
| 2012/0259578 A1 | 10/2012 | Bevilacqua et al. |
| 2013/0194066 A1 | 8/2013 | Rahman et al. |
| 2013/0234924 A1 | 9/2013 | Janefalkar et al. |
| 2013/0249849 A1 | 9/2013 | Wong et al. |
| 2014/0045547 A1 | 2/2014 | Singamsetty et al. |
| 2014/0168060 A1 | 6/2014 | Liao et al. |
| 2014/0308930 A1 | 10/2014 | Tran |
| 2016/0306436 A1 | 10/2016 | Huang |

OTHER PUBLICATIONS

Communication dated Nov. 23, 2017 by the European Patent Office in counterpart European Patent Application No. 15779356.3.
Search Report dated Jul. 6, 2015, issued by the International Searching Authority in counterpart International Application No. PCT/KR2015/003814.
Written Opinion dated Jul. 6, 2015, issued by the International Searching Authority in counterpart International Application No. PCT/KR2015/003814.
Office Action issued in parent U.S. Appl. No. 14/688,431 dated Oct. 17, 2016.
Final Office Action issued in parent U.S. Appl. No. 14/688,431 dated Feb. 23, 2017.
Notice of Allowance issued in parent U.S. Appl. No. 14/688,431 dated Apr. 25, 2017.
Office Action issued in parent U.S. Appl. No. 14/688,431 dated Aug. 16, 2017.
Second Notice of Allowance issued in parent U.S. Appl. No. 14/688,431 dated Feb. 8, 2018.

WEARABLE DEVICE, MASTER DEVICE OPERATING WITH THE WEARABLE DEVICE, AND CONTROL METHOD FOR WEARABLE DEVICE

CROSS-REFERENCE TO RELATED APPLICATION

This is a divisional of U.S. application Ser. No. 14/688,431 filed on Apr. 16, 2015, which claims priority from Korean Patent Application No. 10-2014-0045495, filed on Apr. 16, 2014 in the Korean Intellectual Property Office, the disclosure of which is incorporated herein by reference in its entirety.

BACKGROUND

1. Field

Methods and apparatuses consistent with one or more exemplary embodiments relate to a wearable device that is wearable on a body of a user, a master device connected with the wearable device, and a method of controlling the wearable device.

2. Description of the Related Art

With the development of wired and wireless communication networks, smart devices, which may be used anywhere and be used at any time by being connected to a computer network, such as digital devices having various shapes and functions have been released.

The smart devices may include, but not limited to, wearable devices that are wearable or attachable to a part of a body of a user. The wearable devices of various shapes have been released. In the related art, for the wearable devices, portability is important, and the wearable devices need to be wearable by the user without difficulty. Accordingly, the wearable devices have been developed to be small in size and to be light in weight.

Applications which may perform various functions are installed in the wearable devices, and wearable devices are connected with a mother terminal or master terminal, which is a separate smart device. In this arrangement, the wearable devices need to continuously communicate with the mother terminal, and the wearable devices connected with the mother terminal continuously consume power due to the execution of the installed applications and the continuous communication with the mother terminal.

In consideration of the importance of portability of wearable devices, internal batteries should be limited in size and the amount of power consumed by the wearable devices should be managed. In other words, in order to increase usage time of the wearable devices, the capacitances of internal batteries must be increased, which results in an increase in size and weight of the wearable devices and a decrease in portability.

Accordingly, power consumption of the wearable devices needs to be reduced in order to expand the usage time of the wearable devices while preventing an increase in size and weight of the wearable devices.

Therefore, there is a need to develop a wearable device which consumes minimal power and is still convenient to use.

SUMMARY

One or more exemplary embodiments include a wearable device which may reduce power consumption, a master device connected with the wearable device, and a method of controlling the wearable device.

One or more exemplary embodiments include a wearable device which guarantees user convenience and increases usage time thereof, a master device connected with the wearable device, and a method of controlling the wearable device.

Additional aspects will be set forth in part in the description which follows and, in part, will be apparent from the description, or may be learned by practice of the presented exemplary embodiments.

According to an aspect of an exemplary embodiment, there is provided a wearable device that is wearable on a body of a user, the wearable device including: a display configured to display a screen; a sensor configured to sense motion of the user; and a controller configured to control the display to display the screen, based on a result of the sensing by the sensor.

The controller may determine whether the user is looking at the screen, based on the result of the sensing by the sensor. When the controller determines that the user is not looking at the screen, the controller may control the display such that the display does not display the screen.

The controller may determine whether the user is looking at the screen, based on the result of the sensing of the sensor. When the controller determines that the user is looking at the screen, the controller may control the display such that the display displays the screen.

The controller may control the display such that the display does not display the screen, when the result of the sensing by the sensor includes a first motion in which the user raises a wrist sequentially followed by a second motion in which the user lowers the wrist.

The controller may control the display such that the display displays the screen when the first motion is sensed, and may control the display such that the display does not display the screen when the second motion is sensed.

The controller may control the display such that the display does not display the screen, when the result of the sensing by the sensor includes a first motion in which the user turns a wrist in a first direction sequentially followed by a second motion in which the user turns the wrist in a second direction different from the first direction.

The controller may control the display such that the display does not display the screen, when the result of the sensing by the sensor indicates that the user is walking.

The controller may control the display such that the display does not display the screen, when the result of the sensing by the sensor indicates that the user is running.

The controller may control the display such that the display does not display the screen, when the result of the sensing by the sensor indicates that the user is not wearing the wearable device.

The wearable device may further include a communicator configured to transfer and receive data to and from a master device.

The controller may transmit a first message to the master device to request the master device to stop transfer of data to the wearable device, when the sensor senses that the user has not moved for a first amount of time.

The controller may transmit a second message to the master device to request the master device to restart the transfer of data to the wearable device, when the sensor senses a user motion after the controller has transmitted the first message.

The controller may control the display such that the display does not display a notification screen corresponding to data transferred from the master device, when the sensor senses that the user has not moved for a first amount of time.

According to an aspect of an exemplary embodiment, there is provided a master device including: a communicator configured to transfer and receive data to and from a wearable device; and a controller configured to stop or re-start data transferring and receiving to and from the wearable device, according to a signal strength of the received data.

The communicator may include a Bluetooth module which performs data communication with the wearable device according to the Bluetooth communication standards. The controller may stop or re-start data transferring and receiving to and from the wearable device, based on a received signal strength indicator (RSSI) obtained by the Bluetooth module.

The controller may stop data transferring and receiving to and from the wearable device, if the RSSI is less than a first reference value.

The controller may re-start data transferring and receiving to and from the wearable device, if the RSSI is equal to or higher than the first reference value.

According to an aspect to another exemplary embodiment, there is provided a method of controlling a wearable device that is wearable on a body of a user including: sensing motion of the user; determining whether to display a screen of the wearable device, based on a result of the sensing; and displaying the screen of the wearable device based on the determination.

According to an aspect of another exemplary embodiment, there is provided a wearable device that is wearable on a body of a user, the wearable device including: a display configured to display a screen; a sensor configured to sense motion of the user; and a controller configured to control the display based on the sensed motion.

The controller may be configured to determine whether the user is looking at the screen based on the sensed motion, and in response to the controller determining that the user is not looking at the screen, the controller may be configured to control the display to not display the screen.

The controller may be configured to determine whether the user is looking at the screen based on the sensed motion, and in response to the controller determining that the user is looking at the screen, the controller may be configured to control the display to display the screen.

The controller may be configured to control the display to not display the screen, in response to the sensed motion comprising a first motion corresponding to the user raising a wrist sequentially followed by a second motion corresponding to the user lowering the wrist.

The controller may be configured to control the display to display the screen in response to the sensor sensing the first motion and configured to control the display to not display the screen in response to the sensor sensing the second motion.

The controller may be configured to control the display to not display the screen, in response the sensed motion comprising a first motion corresponding to the user turning a wrist in a first direction sequentially followed by a second motion corresponding to the user turning the wrist in a second direction different from the first direction.

The controller may be configured to control the display not to display the screen, in response to the sensed motion indicating that the user is walking.

The controller may be configured to control the display to not display the screen, in response to the sensed motion indicating that the user is running.

The controller may be configured to control the display to not display the screen, in response to the sensed motion indicating that the wearable device is not provided on the user.

The wearable device may further include a communicator configured to transfer and receive data to and from a master device.

The controller may be configured to transmit a first message to the master device to request the master device to stop transfer of data to the wearable device in response to the sensor sensing that the user has not moved for a first duration.

The controller may be configured to transmit a second message to the master device to request the master device to restart the transfer of data to the wearable device in response to the sensor sensing a user motion after the controller transmitting the first message.

The controller may be configured to control the display to not display a notification screen corresponding to data transferred from the master device in response to the sensor sensing that the user has not moved for a first duration.

According to an aspect of another exemplary embodiment, there is provided a method of controlling a wearable device that is wearable on a body of a user, the method including: sensing motion of the user; determining whether to display a screen on the wearable device based on the sensed motion; and displaying the screen on the wearable device based on the determination.

The determining may include: determining whether the user is looking at the wearable device based on the sensed motion; and determining not to display the screen in response to a determination that the user is not looking at the wearable device.

The determining may include: determining not to display the screen in response to the sensed motion comprising a first motion corresponding to the user raising a wrist sequentially followed by a second motion corresponding to the user lowering the wrist.

The determining may include: determining not to display the screen in response to the sensed motion indicating that the user is not wearing the wearable device.

The determining may include determining not to display the screen in response to the sensed motion comprising a first motion corresponding to the user turning a wrist in a first direction sequentially followed by a second motion corresponding to the user turning the wrist in a second direction different from the first direction.

The determining may further include: transmitting a first message to a master device requesting the master device to stop transfer of data to the wearable device in response to the sensed motion indicating that the user has not moved for a first duration; and transmitting a second message to the master device requesting the master device to restart the transfer of data to the wearable device in response to the sensed motion indicating that the user moves after the first message being transmitted to the master device.

The determining may include determining not to display a notification screen corresponding to data transferred from the master device in response to the sensed motion indicating that the user has not moved for a first duration.

According to an aspect of another exemplary embodiment, there is provided a wearable device communicating with a master device and wearable on a body of a user, the wearable device including: a display configured to display a screen; a communicator configured to exchange data between the wearable device and the master device; a sensor configured to sense at least one of motion of the user and signal strength between the wearable device and the master device; and a controller configured to control the display based on the sensed motion and configured to control the communicator to exchange the data between the wearable device and the master device based on the sensed signal strength.

The controller may be configured to control the display to display or not to display the screen in response to the controller determining whether the user is looking at the screen or not.

The controller may be configured to control the communicator to exchange or not exchange the data in response to the controller determining whether the sensed signal strength is greater than or equal to a first reference value.

In response to the controller determining that the user is not looking at the screen, the controller may be configured to control the display to not display the screen.

In response to the controller determining that the user is looking at the screen, the controller may be configured to control the display to display the screen.

BRIEF DESCRIPTION OF THE DRAWINGS

The above and/or other aspects of the disclosure will become apparent and more readily appreciated from the following description of exemplary embodiments, taken in conjunction with the accompanying drawings in which.

DETAILED DESCRIPTION

Figure 1:
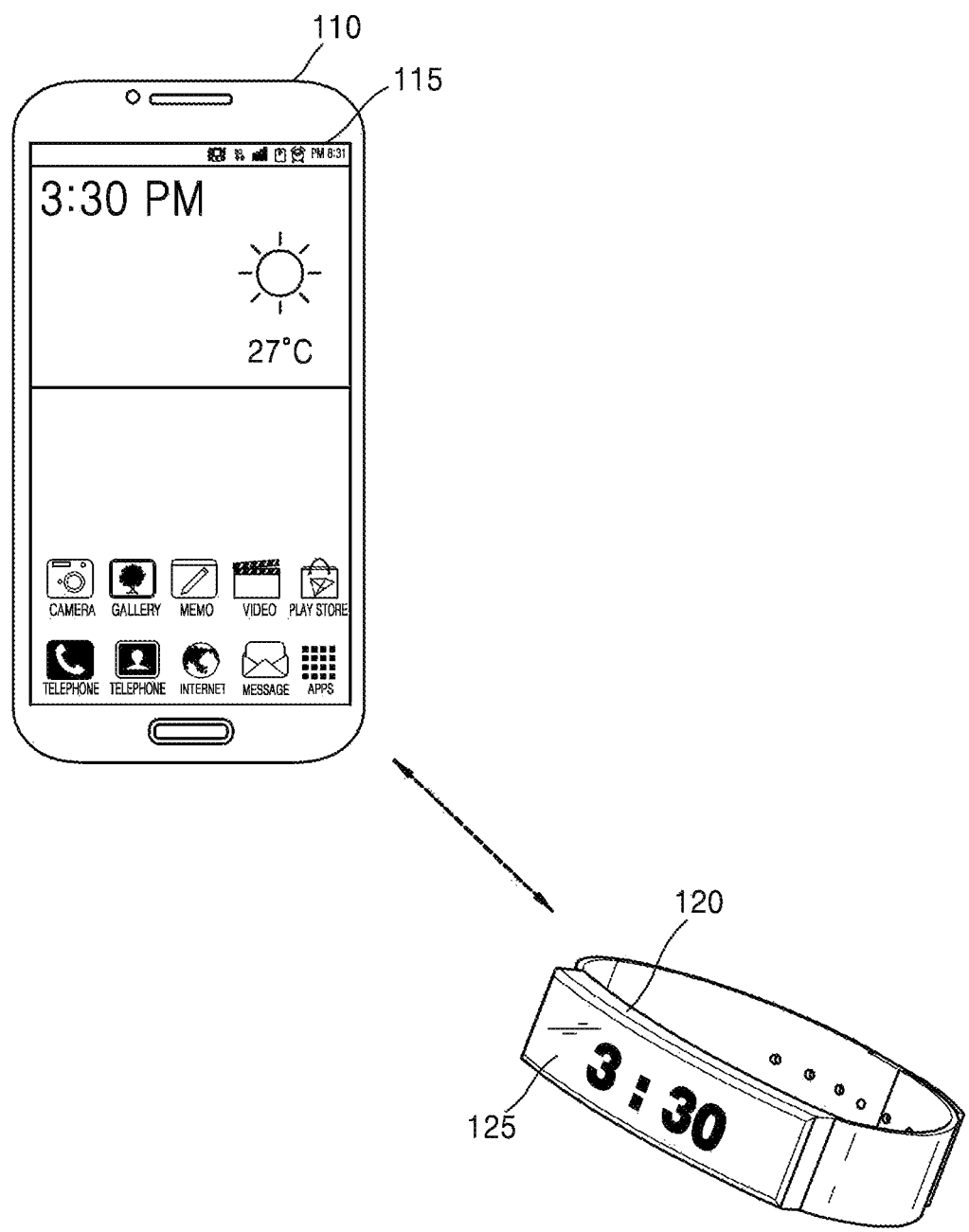
FIG. 1 is a view for describing a wearable device and a master device, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Also, parts in the drawings unrelated to the detailed description are omitted to ensure clarity of the inventive concept.

Accordingly, the exemplary embodiments are merely described below, by referring to the figures, to explain aspects of the present description. Expressions such as "at least one of," when preceding a list of elements, modify the entire list of elements and do not modify the individual elements of the list.

The terms used in this specification will be briefly described and embodiments of the present inventive concept will be described in detail.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

When a part "includes" or "comprises" an element, unless there is a particular description contrary thereto, the part can further include other elements, not excluding the other elements. The term "unit" in the embodiments of the present invention means a software component or hardware components such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units."

FIG. 1 is a view for describing a wearable device 120 and a master device 110 according to an exemplary embodiment.

Referring to FIG. 1, a plurality of smart devices may operate while a connection is established among the same. Hereinafter, descriptions will be made by focusing on the case in which two smart devices operate and have a connection established between the two smart devices. Here, the two smart devices are a mother terminal operating as the master device 110 and the wearable device 120 operating by being connected with the terminal. Also, the wearable device 120 may operate while being connected with the mother terminal, or may operate independently from the mother terminal.

Hereinafter, the mother terminal is referred to as "the master device" and the smart device which may operate by being connected with the mother terminal is referred to as "the wearable device." The wearable device may operate as a slave device of the master device.

The master device 110 may be an electronic device which may autonomously perform a pre-determined application or operation by executing installed applications for performing pre-determined functions. Such master device 110 may be, but not limited to, portable computers, such as notebooks, net books, or tablet personal computers (PCs), portable terminals, such as smart phones or personal digital assistants (PDAs), and smart televisions (TVs).

In addition, the wearable device 120 may be attached to, worn on, or inserted into a human body, and may input and output information. The wearable device 120 may process information that is input and may perform operations corresponding thereto by executing installed applications.

Also, the wearable device 120 may be connected with the master device 110 via a network, and may transfer and receive data to and from the master device 110.

Also, the wearable device 120 may autonomously operate. For example, the wearable device 120 may include applications installed therein, and thus, may autonomously perform operations corresponding thereto.

The wearable device 120 may have various shapes. For example, the wearable device 120 may be a watch, a bracelet, or a wearing glasses.

In FIG. 1, the master device 110 is exemplified as a smart phone, and the wearable device 120 is exemplified as a smart watch which may be worn on a user's wrist. Hereinafter, inter-operations between the two smart devices, the master device 110 being exemplified as a smart phone and the wearable device 120 being exemplified as a smart watch, are described.

The master device 110 has various applications installed therein for performing various operations corresponding thereto. For example, the master device 110 may execute applications for reproducing media, such as music and video, messenger applications for chatting or for transferring and receiving messages, such as texts, and applications for games. The master device 110 displays a user interface screen for user interfacing or an application execution screen via a display 115.

The wearable device 120 may transfer and receive data to and from the master device 110 through a network. For example, the wearable device 120 receives information about various events occurring in the master device 110 and displays a screen for notifying a user of the received information, via a display 125 of the wearable device 120.

When events such as phone calls, alarms, schedules, unanswered calls, text messages, chat messages, and emails occur in the master device 110, the master device 110 transfers data related to the above-described events to the wearable device 120 through a network. Then, the wearable device 120 may receive the data transferred from the master device 110 and display a screen notifying the user of the occurrence of the events via the display 125.

When a user sets a notification mode of the master device 110 to a vibration mode and puts the master device 110 in a pocket of his/her coat, or when a user sets the notification mode of the master device 110 to a sound mode and is in a noisy location, the user may be unable to instantly recognize the events occurring in the master device 110. In the above-described situations, the user may rapidly and easily recognize the events occurring in the master device 110, if the wearable device 120 outputs a notification with respect to the events occurring in the master device 110, by using at least one of vibration, a sound, and a visually recognizable screen.

Also, the wearable device 120 may be used to conveniently control the operation of the master device 110. For example, when the master device 110 is playing a music file, the wearable device 120 may conveniently be used to, for example, select, play, and pause the music file.

Also, the wearable device 120 may operate independently from the master device 110. For example, the wearable device 120 may include a sensor related to fitness, such as a heart rate sensor, and may provide a fitness function by using the included sensor. For example, the wearable device 120 may measure exercise time and a traveled distance while running, hiking, etc, and may measure a heart rate of the user and provide the same to the user.

Hereinafter, detailed configurations of wearable devices which may reduce power consumption, according to exemplary embodiments of the present inventive concept, will be described by referring to FIGS. 2 through 10.

Figure 2:
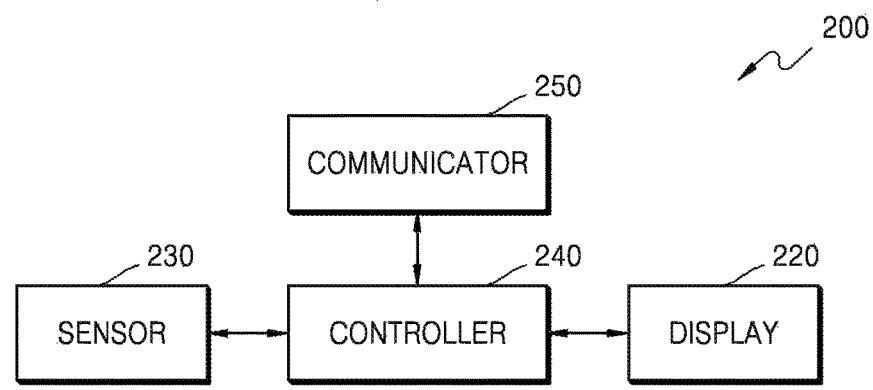
FIG. 2 is a block diagram of a wearable device, according to an exemplary embodiment.

FIG. 2 is a block diagram of a wearable device 200 according to an exemplary embodiment.

Referring to FIG. 2, the wearable device 200 may include a display 220, a sensor 230, and a controller 240. Also, the wearable device 200 may further include a communicator 250.

The display 220 displays a screen. In detail, the display 220 may include a display panel (not shown) and may display the screen by using the display panel. Here, the display panel may be an LCD panel, an OLED panel, an AMOLED panel, or a PDP panel.

The sensor 230 senses motion of a user. For example, the sensor 230 may sense motion of a pre-determined body part of the user while the user is wearing the wearable device 200 on the pre-determined body part.

The controller 240 controls whether the screen is displayed based on a result of the sensing of the sensor 230. For example, the controller 240 may control the display to turn the screen on or off based on the result of the sensing of the sensor 230.

The controller 240 may determine whether the user is looking at the screen, based on the result of the sensing by the sensor 230. In response, when it is determined that the user is not looking at the screen, the controller 240 may control the display not to display the screen. Also, the controller 240 determines whether the user is looking at the screen, based on the result of the sensing by the sensor 230. When it is determined that the user is looking at the screen, the controller 240 may control the display to display the screen.

The controller 240 may access sensing data of the sensor 230, and when the sensing data indicates a certain motion of the user, the controller 240 may determine that the user is not looking at the display 220 and may control the display 220 such that the display 220 does not display the screen.

Also, the controller 240 may control the display 220 such that the display 220 does not display the screen, when the controller 240 determines that the user is not using the wearable device 200, based on the result of the sensing of the sensor 230.

Hereinafter, displaying of the screen via the display 220 is referred to as "display on" and non-displaying of the screen by shutting off or minimizing power supplied to the display panel is referred to as "display off." When the display is off, the power supplied to the display panel is shut off or the display panel displays only a black screen.

The communicator 250 may transfer and receive data to and from a master device (i.e., See FIG. 1; 110), which is another smart device connected with the wearable device 200 via a wired or wireless network.

For example, when the controller 240 determines that the user is not looking at or using the wearable device 200, based on the result of the sensing of the sensor 230, the controller 240 may control the display 220 such that the display 220 does not display a notification screen corresponding to an event even if data indicating an occurrence of the event (for example, receipt of a text message) is received from the master device via the communicator 250.

Detailed operations and configurations of the wearable devices will be described hereinafter by referring to FIGS. 3 through 10.

Figure 3:
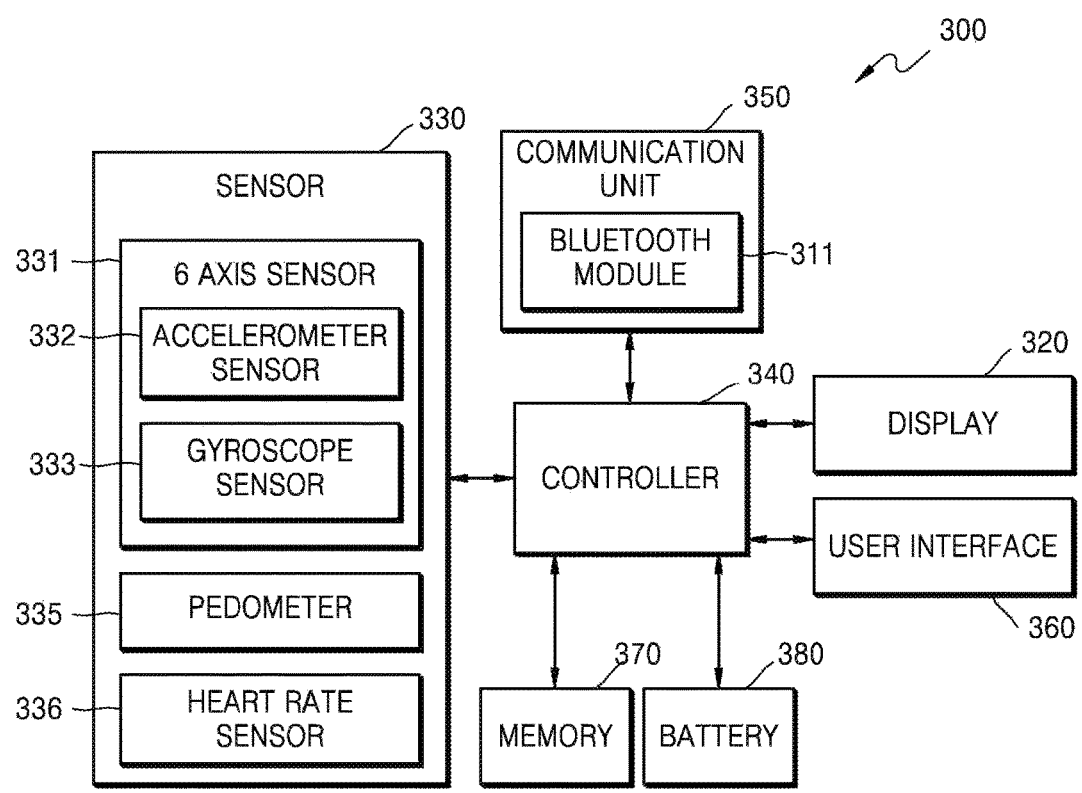
FIG. 3 is a block diagram of a wearable device, according to an exemplary embodiment.

FIG. 3 is a block diagram of a wearable device 300 according to an exemplary embodiment. The wearable device 300 may include a display 320, a sensor 330, and a controller 340. Also, the wearable device 300 may further include at least one selected from a communicator 350, a user interface 360, a memory 370, and a battery 380. In FIG. 3, the display 320, the sensor 330, and the controller 340 respectively correspond to the display 220, the sensor 230, and the controller 240 illustrated in FIG. 2. Thus, repeated descriptions with respect to FIG. 2 will be omitted in the description of the wearable device 300.

Referring to FIG. 3, the display 320 displays a screen.

For example, the screen displayed by the display 320 may include a watch screen showing the time, a screen displayed according to execution of an application installed in the wearable device 300, a screen indicating an event occurring in a connected master device (i.e., See FIG. 1; 110), or a screen for controlling the connected master device.

In detail, the event occurring in the connected master device may include receipt of a short message service (SMS) message, a multi-media message service (MMS) message, an email, or a chat-on message, a notification of an occurrence of a schedule according to a schedule management application, or a time notification. When the above-described events occur in the master device, the screen indicating the events may be output via the display 320 of the wearable device 300. Hereinafter, the screen displayed by the display 220 in correspondence with the occurrence of the above-described events is referred to as a notification screen.

The sensor 330 includes at least one sensor for sensing motion of a user. For example, the sensor 330 may sense user's motion in three-dimensions (i.e., a gesture of the user).

The sensor 330 may include a sensor 331 which may sense the motion in six (6) directions including up, down, right, left, forward, and backward. The sensor 330 may also include an accelerometer sensor 332. Also, the sensor 330 may further include a gyroscope sensor 333.

The accelerometer sensor 332 may measure gravitational acceleration and an acceleration of motion with respect to Cartesian axes (i.e., in x, y, and z directions) to measure a velocity and/or location of the wearable device 300.

Also, the gyroscope sensor 333 may measure a change in angle by measuring an acceleration with respect to the x, y, and z axes, and may measure the velocity and/or location of the wearable device 300.

The sensor 330 may sense the motion of the user in the six (6) directions, based on the sensing result via at least one of the accelerometer sensor 332 and the gyroscope sensor 333.

Also, the sensor 330 may further include at least one of a pedometer 335 and a heart rate sensor 336. The pedometer 335 is a sensor for recording steps of a user, and may record the movement of the user according to the number of steps taken by the user. Also, the heart rate sensor 336 may measure a heart rate of the user. For example, when the user exercises, or needs to measure heart rate, the user may use the heart rate sensor 336.

Also, the sensor 330 may further include a geomagnetic sensor (not shown), a gravity sensor (not shown), a light sensor (not shown), and a temperature sensor (not shown). The geomagnetic sensor is a sensor that may detect an azimuth by using an earth's magnetic field. The gravity sensor is a sensor which detects motion by searching a direction of gravity, and may recognize alignment of the wearable device 300 with respect to a vertical direction or a horizontal direction. Also, the temperature sensor is a sensor which may measure temperature.

The sensor 330 may sense various types of motion including the gesture of the user, by using the above-described sensors.

The communicator 350 transfers and receives data to and from the master device, which is another smart device connected with the wearable device 300 via a wired or wireless network. For example, the communicator 350 may receive information corresponding to events occurring in the master device. Here, the information corresponding to events may include the SMS message, the MMS message, the email, or the chat-on message. The communicator 350 receives data including the information with respect to the SMS message, the MMS message, the email, and the chat-on message from the master device. Hereinafter, the data transferred from the master device to the communicator 350 of the wearable device 300 in correspondence with the events occurring is referred to as "notification data." Also, the screen generated in correspondence with the notification data is referred to as a "notification screen."

The communicator 350 may include a communication module for accessing a pre-determined network in a wired or wireless manner. For example, the communicator 350 may include a Bluetooth module 311. Bluetooth is a communication protocol via which electronic devices may communicate with one another and transfer and receive data at high speed by using a radio frequency signal, without any physical connection (e.g., a cable). Bluetooth consumes little power when transferring and receiving data and may stably transfer and receive data, and thus, if Bluetooth is used for transferring and receiving data between the wearable device 300 and the master device, power consumption may be reduced, while data is stably transferred and received.

The Bluetooth module 311 may receive the notification data transferred from the master device in a serial port profile (SPP) method. For example, the Bluetooth module 311 may receive the SMS message, the MMS message, the email, or the chat-on message, the notification information of a schedule occurrence according to the schedule management application, and the time notification information, by using the SPP method.

Also, the communicator 350 may be a communication module configured to transfer and receive data to and from the master device via, for example, a wireless LAN (WLAN), Wi-Fi, 3G, long term evolution (LTE), wireless broadband (Wibro), world interoperability for microwave access (Wimax), CDMA, or WCDMA.

Also, the communicator 350 may be a communication module configured to transfer and receive data to and from the master device via near field communication (NFC). Accordingly, because NFC is supported, when the master device is near to or contacts the wearable device 300, pre-determined data may be transferred and received between the master device and the wearable device 300.

Hereinafter, descriptions will be made by focusing on the case in which the communicator 350 includes the Bluetooth module 311.

The Bluetooth module 311 may measure strength of a signal transferred from the master device, and the controller 340 may control on and off of a display according to the strength of the received signal measured by the Bluetooth module 311.

Specifically, the Bluetooth module 311 may obtain a received signal strength indicator (RSSI) of the signal transferred and received from the master device. Here, the RSSI is a value indicating a strength of the signal transferred to the Bluetooth module 311. The controller 340 may stop or re-start data transferring and receiving to and from the master device, according to the signal strength of the received data. For example, the controller 340 may stop data transferring and receiving to and from the master device, if the RSSI is less than a first reference value. Accordingly, the notification data corresponding to the event occurrence in the master device may not be received, and the notification screen may not be displayed.

When a distance between the master device and the wearable device 300 is increased, the strength of the signal received from the master device is decreased. Thus, if the RSSI is obtained, whether the wearable device 300 is far from or near to the master device may be determined.

Here, the first reference value may vary according to specifications of the Bluetooth module 311. For example, if the Bluetooth module 311 is able to detect a low-amplitude signal, the first reference value may be set as a low value. For example, the first reference value may be set as −70 dBm. In this case, if the RSSI is less than −70 dBm, the controller 340 may determine that the wearable device 300 is far away from the master device and may stop data transferring and receiving between the wearable device 300 and the master device. Also, if the RSSI is equal to or higher than −70 dBm, the controller 340 may determine that the wearable device 300 is within a pre-determined distance from the master device and may re-start data transferring and receiving between the wearable device 300 and the master device.

The controller 340 may turn the display on or off, based on the result of the sensing by the sensor 330. For example, the controller 340 may control the display such that the display turns off the screen of the display 320 or such that the display does not display the notification screen even when the notification of an event occurrence is received from the master device, if it is determined that the user is not looking at the display 320 of the wearable device 300 or that the user is not using the wearable device 300, based on the result of the sensing of the sensor 330.

Specifically, the controller 340 determines whether the user is moving by accessing sensing data output by the sensor 330. Also, when it is determined that the user is not moving, the controller 340 may control the screen of the display 320 such that the screen is turned off.

For example, when the user puts the wearable device 300 on a table or when the user is asleep while wearing the wearable device 300, the sensor 330 does not sense motion, and, the controller 340 may determine that the user is not using the wearable device 300. The controller 340 may control the display 320 such that the display 320 turns off the screen of the display 320 when the controller 340 determines via the sensor 330 that the user has not moved for a period of time, for example, one hour, in order to prevent power consumption which would otherwise result if the screen of the display 320 is turned on even when the user is not moving. Here, the predetermined period of time may be directly input by the user or the controller 340 may autonomously set the same.

Also, the controller 340 may determine whether the user is wearing the wearable device 300 or not by accessing the sensing data output from the sensor 330. For example, the sensor 330 may sense the motion of the user by using at least one of the gyroscope sensor 333 and the accelerometer sensor 332. Alternatively, when the sensor 330 includes a temperature sensor (not shown), the controller 340 may determine that the user is wearing the wearable device 300, if a temperature corresponding to body heat is sensed by the temperature sensor. Alternatively, when the sensor 330 includes the heart rate sensor 336, the controller 340 may determine that the user is wearing the wearable device 300, if the user's heart rate is sensed by the heart rate sensor 336. Also, the controller 340 may control the screen of the display 320 such that the screen is not displayed, when it is determined that the user is not wearing the wearable device 300.

Also, the controller 340 may detect whether the user raises a wrist or whether the user turns the wrist by accessing the sensing data output from the sensor 330. Also, the controller 340 may control the display on and off according to whether a gesture that the user raises the wrist is sensed or not. The user interface 360 receives an input of a request, an instruction, or other data from the user.

The user interface 360 may be a touch screen. For example, the user interface 360 may include a touch pad (not shown) which is combined with a display panel (not shown). When the user interface 360 is a touch screen, the user interface 360 may output, on the display panel that is combined with the touch pad, a menu screen that is a user interface screen. When the user touches a pre-determined point on the menu screen, for example, a point in which a mirroring service menu is displayed, the user interface 360 senses the point touched by using the touch pad. Then, the user interface 360 may transfer the sensing information to the controller 340. Then, the controller 340 may interpret the touched point to interpret the user's command and request and the data.

The memory 370 may store at least one selected from various data, programs, applications, and data transferred and received.

The battery 380 includes a rechargeable battery and supplies power to each component of the wearable device 300.

Hereinafter, an operation for determining whether the user is looking at the display 320 of the wearable device 300 or not based on the result of the sensing of the sensor 330 will be described in detail by referring to FIGS. 4 and 5.

Figure 4:
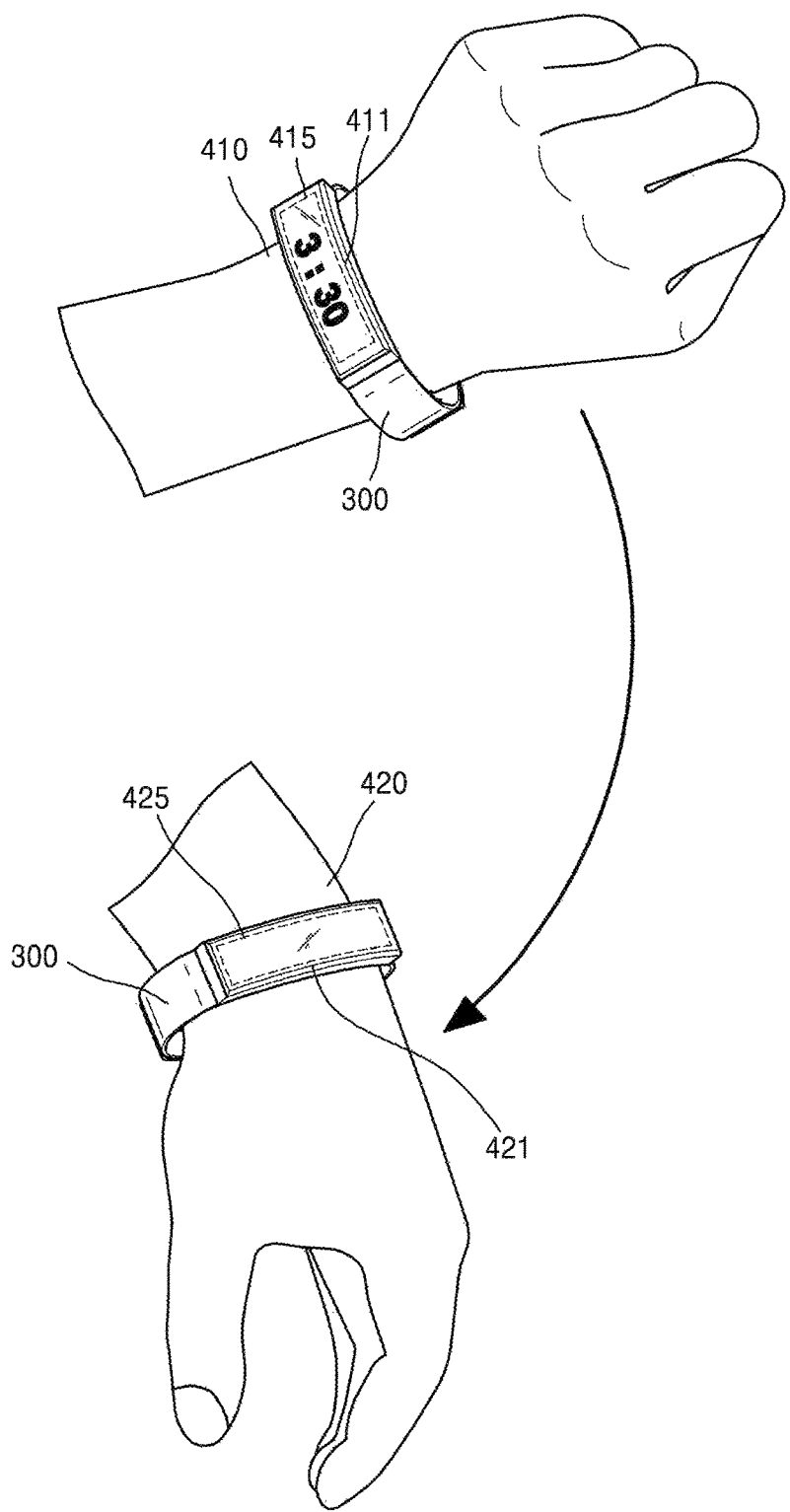
FIG. 4 is a view for describing an operation of a wearable device, according to an exemplary embodiment.

FIG. 4 is a view for describing an operation of the wearable device 300.

Referring to FIGS. 3 and 4, the controller 340 may control the screen such that the screen is not displayed, when the controller 340 senses a first motion in which a user raises a wrist 410 sequentially followed by a second motion in which the user lowers a wrist 420, based on the result of the sensing of the sensor 330.

Specifically, when the user raises the wrist 410 and then lowers the wrist 420 as illustrated in FIG. 4, the screen 421 of the wearable device 300 may be turned off. In the case of the wearable device 300 worn on a wrist, the user has to raise the wrist 410 as illustrated in a top figure of FIG. 4, when a user wants to view the screen of the wearable device 300. Then, once the user has identified the information displayed by the screen 411, the user may lower the wrist 420 again as illustrated in a bottom figure of FIG. 4. When the wrist 420 is lowered, the user may be unable to view the screen 421, and thus, the screen 421 does not need to be displayed. Therefore, when the wrist 410 is raised, the screen 411 of predetermined content is displayed on the screen 411, and when the wrist 420 is lowered, nothing is displayed on the screen 421, as indicated by a portion 425 illustrated in FIG. 4.

As described above, the controller 340 may control the display 320 such that the display turns off the screen of the display 320, when the user's wrist is raised and then lowered, so that power consumption may be reduced.

The sensing operation of the wrist motion may be performed by the controller 340 as follows.

The accelerometer sensor 332 of the sensor 330 transfers sensing data to the controller 340. The controller 340 logs onto the sensing data and senses motion and recognizes a "no move" point where the motion stops. Then, the controller 340 determines a gesture of the user by using the sensing data at the "no move" point. Specifically, the controller 340 may determine whether the user performs an operation of looking at the screen of the wearable device 300, by using the sensing data at the "no move" point. The controller 340 may determine that the user is looking at the screen of the wearable device 300, when the sensing data indicates that a variation between motion of the user at a point prior to the "no move" point and motion of the user at the "no move" point has a value of −3 $m/s^2$ through 3 $m/s^2$ in a direction of an x axis, and the sum of a variation of the sensing data sensed at the "no move" point in an direction of a y axis and a variation of the sensing data sensed at the "no move" point in a direction of a z axis is equal to or higher than 5 $m/s^2$. A data value of the accelerometer sensor 332, by which the gesure of the user looking at the screen of the wearable device 300 may be determined, may be obtained experimentally or statistically. That is, an accelerometer variation that is a data value of the accelerometer sensor 332 is determined by measuring acceleration and deceleration values corresponding to gestures of a plurality of users looking at the screen of the wearable device 300, and then, based on the measured acceleration and deceleration values, a reference value for determining the gesture of the user looking at the screen of the wearable device 300 may be set. Also, the reference value according to the exemplary embodiment may be changed according to experimental results.

A gesture of the user not looking at the screen of the wearable device 300 by lowering the wrist may be determined when a reverse direction variation of the variation of the sensing data when the wrist is raised is sensed. Here, forward and backward directions of the user may be along the x axis, right and left directions of the user may be along the y axis, and up and down directions of the user may be along the z axis.

As described above, the accelerometer sensor 332 of the sensor 330 measures the variations in measured acceleration and deceleration in the x, y, and z axis directions, and the controller 340 may specifically determine the gesture of the user based on the variation measured by the accelerometer sensor 332.

For example, when notification data notifying an event is received from the master device, the controller 340 may control the notification screen notifying the event occurrence such that the notification screen is displayed. Accordingly, the display 320 turns on the display and displays the notification screen. Then, the user may view the notification screen by raising the wrist 410. Next, when the user views the notification screen and lowers the wrist 420, the controller 340 may sense the motion of the user and control the display 320 such that the display 320 turns off the display.

Also, when the first motion in which the user's wrist is raised is sensed, the controller 340 may control the screen such that the screen is displayed, and when the second motion in which the user's wrist is lowered is sensed, the controller 340 may control the screen such that the screen is not displayed.

FIG. 5 is a view for describing an operation a wearable device 520 according to an exemplary embodiment.

Referring to FIGS. 3 and 5, the controller 340 may control the screen such that the screen is not displayed, when the controller 340 senses a first motion in which a user 510 turns a wrist 530 in a first direction sequentially followed by a second motion in which the user turns a wrist 550 in a second direction, based on the result of the sensing of the sensor 330.

Figure 5A:
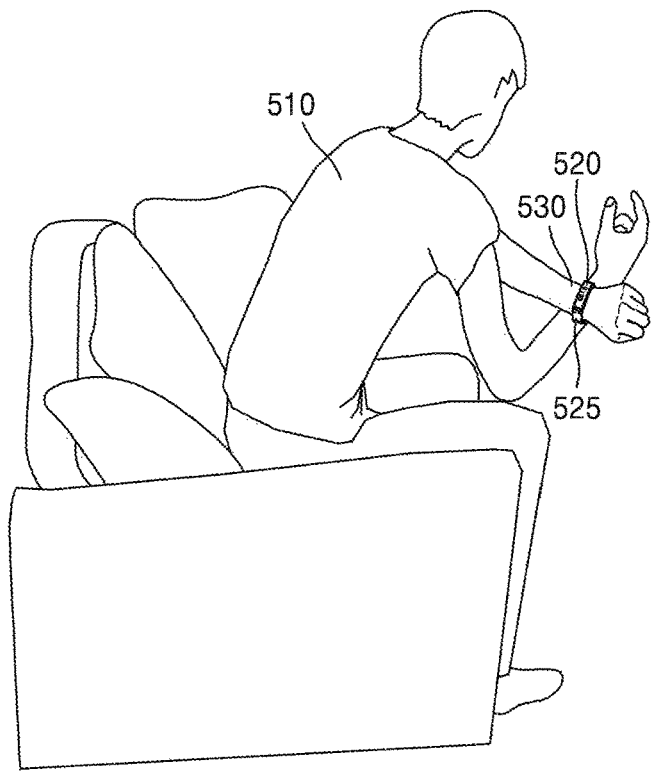
FIGS. 5A and 5B are views for describing an operation of a wearable device, according to an exemplary embodiment.

Referring to FIG. 5A, the user 510 turns/rotates the wrist 530 in the first direction and views a screen 525 displayed by the wearable device 520.

Figure 5B:
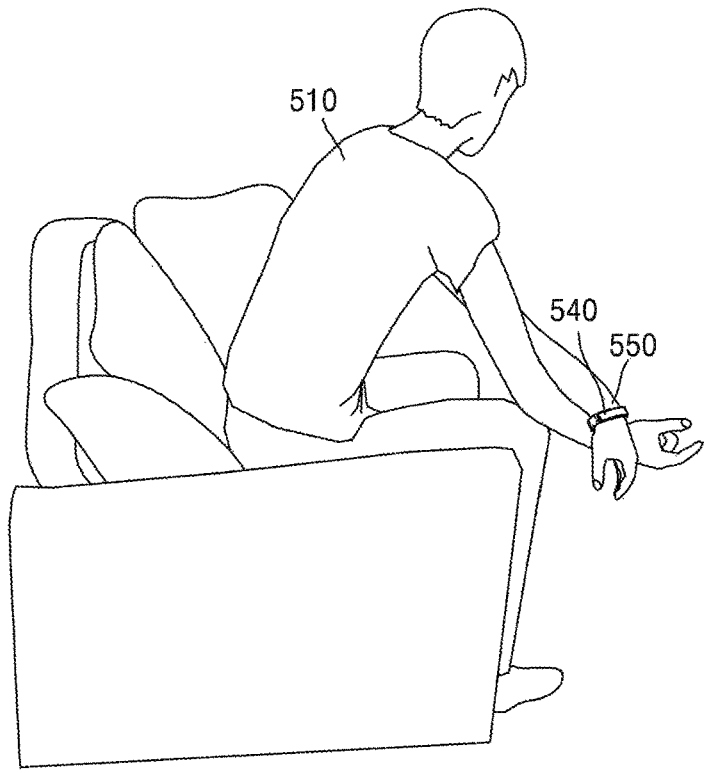

Next, as illustrated in FIG. 5B, the user 510 identifies the screen 525, and then turns the wrist 550 in the second direction that is opposite to the first direction. When the wrist 550 is turned in the second direction, the controller 340 may control a screen of a wearable device 540 such that the display of the screen is turned off.

In the case of the wearable device 510 worn on a wrist, the user needs to turn the wrist 530 towards the user so that the screen 525 faces the user's face as illustrated in FIG. 5A in order to view the screen 525 of the wearable device 510. Then, after the user views the information displayed by the screen 525, the user may return the wrist 530 back to its original position. Thus, if the screen of the wearable device 540 does not face the face of the user 510 since the wrist 550 is returned to the original position thereof, as illustrated in FIG. 5B, the user may be unable to view the screen of the wearable device 540 such that there is no need to turn on the display of the screen.

As described above, the controller 340 may control the display 320 such that the display 320 turns off the display of the screen, when the user's wrist is turned in the first direction and then subsequently turned again in the second direction that is opposite to the first direction, thereby reducing power consumption.

When an event occurs in the master device and data notifying the event is received from the master device, the controller 340 may control the notification screen notifying the occurrence of the event such that the notification screen is displayed. Accordingly, the display 320 may turn on the display and display the notification screen. Then, the user may view the notification screen by turning the wrist 530 in the first direction. Next, when the user turns the wrist 550 in the second direction opposite to the first direction after viewing the notification screen, the controller 340 may sense the motion of the user via the sensor 330 and may control the display 320 such that the display 320 turns off the display of the screen.

Also, when the controller 340 senses that the user is running based on the result of the sensing of the sensor 330, the controller 340 may control the screen such that the screen is not displayed. For example, the sensor 330 may sense that the user is running, by using an accelerometer value corresponding to forward and backward directions in which the user is running as sensed by the accelerometer sensor 333 and a heart rate value of the user sensed by the heart rate sensor 336. When the user is exercising, the user may not be aware of a notification due to an event occurrence in the master device even if the notification is transferred to the display 320 from the master device. Thus, in this case, the display 320 may control the display 320 to not display the notification screen, in order to reduce power consumption.

Also, when the controller 340 senses that the user is walking based on the result of the sensing of the sensor 330, the controller 340 may control the screen such that the screen is not displayed. For example, the sensor 330 may sense that the user is walking, by using an accelerometer value corresponding to forward and backward directions in which the user is walking as sensed by the accelerometer sensor 333 and the number of steps taken by the user as sensed by the pedometer 335. When the user is walking, the user may not be aware a notification due to an event occurrence in the master device even if the notification is transferred to the display 320 from the master device. Thus, in this case, the display 320 may not display the notification screen, in order to reduce power consumption.

Figure 6:
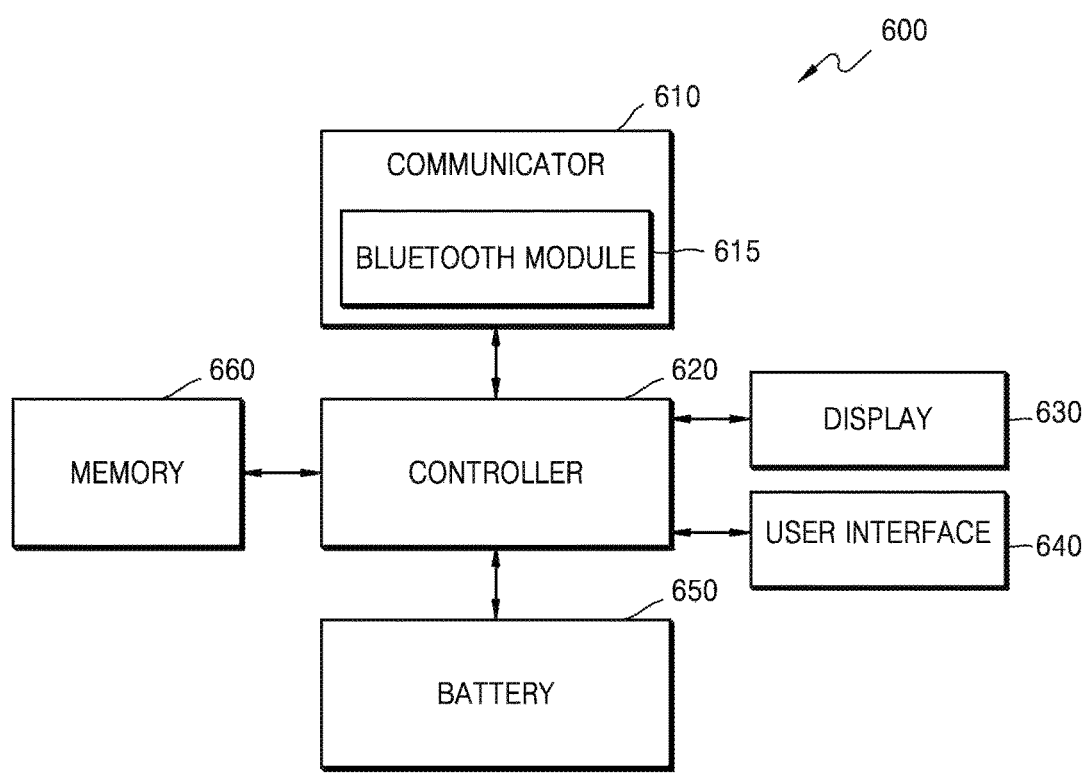
FIG. 6 is a block diagram of a master device, according to an exemplary embodiment.

FIG. 6 is a block diagram of a master device 600 according to an exemplary embodiment.

The master device 600 is a smart device which may operate by being connected with the wearable device 300, and corresponds to the master device 110 described with reference to FIG. 1. Thus, repeated descriptions with respect to FIG. 1 will be omitted in the description of the master device 600.

The master device 600 may be an electronic device which may autonomously perform a pre-determined application or operation executing applications installed therein for performing pre-determined functions, such as portable computers, such as notebooks, net books, or tablet PCs, portable terminals, such as smart phones or PDAs, and smart TVs. Hereinafter, the case in which the master device 600 is a smart phone which may operate by being connected with the wearable device 300 will be described.

Referring to FIG. 6, the master device 600 includes a communicator 610 and a controller 620. Also, the master device 600 may further include a display 630, a user interface 640, a battery 650, and a memory 660.

The communicator 610 transfers and receives data to and from the wearable device 300.

The communicator 610 transfers and receives data to and from the wearable device 300, which is another smart device connected with the master device 600 via a wired or wireless network. For example, the communicator 610 may transfer notification data for notifying a user of an occurrence of an event when the event such as receipt of an email, a text message, and a chat-on message occurs, to the communicator 350 of the wearable device 300. Also, the communicator 610 may transfer and receive pre-determined data to and from an external electronic device or a server through a pre-determined network. The communicator 610 may include a communication module for accessing the pre-determined network in a wired or wireless manner. For example, the communicator 610 may include a Bluetooth module 615 which transfers and receives data according to the Bluetooth communication standards.

Also, the communicator 610 may include a WLAN, Wi-Fi, 3G, LTE, Wibro, Wimax, CDMA, or WCDMA module to transfer and receive data to and from other electronic devices including the wearable device 300.

Also, the communicator 610 may include a communication module according to NFC. Accordingly, since a near field connection method is supported, when other electronic devices including the wearable device 300 is near or contacts the master device 600, pre-determined data may be transferred and received between the electronic devices and the master device 600.

Hereinafter, descriptions will be made by focusing on the case in which the communicator 610 includes the Bluetooth module 615, and the master device 600 transfers and receives data to and from the wearable device 300 by using the Bluetooth module 615. The Bluetooth module 615 may measure strength of a signal transferred from the wearable device 300. In detail, the Bluetooth module 615 may obtain an RSSI of the signal transferred and received from the wearable device 300.

The controller 620 may stop or re-start data transferring and receiving to and from the wearable device 300 according to the strength of the transferred or received signal.

The controller 620 may stop or re-start data transferring and receiving to and from the wearable device 300 based on the RSSI obtained from the Bluetooth module 615. In detail, the controller 620 may stop data transferring and receiving to and from the wearable device 300, if the RSSI is less than a first reference value. When a distance between the master device 600 and the wearable device 300 is increased, the strength of the signal received by the Bluetooth module 615 of the master device 600 is decreased. Thus, if the RSSI is obtained, whether the wearable device 300 is far from or near to the master device 600 may be determined.

Here, the first reference value may vary according to specifications of the Bluetooth module 615. For example, if the Bluetooth module 615 is able to detect a low-amplitude signal, the first reference value may be set as a low value. For example, the first reference value may be set as −70 dBm. In this case, if the RSSI is less than −70 dBm, the controller 620 may determine that the wearable device 300 is far away from the master device 600 and may stop data transferring and receiving between the wearable device 300 and the master device 600. Also, if the RSSI is equal to or higher than −70 dBm, the controller 620 may determine that the wearable device 300 is within a pre-determined distance from the master device 600 and may re-start data transferring and receiving between the wearable device 300 and the master device 600.

The display 630 may display a screen. Here, the screen may include a screen displayed according to an execution of an application installed in the master device 600, a menu screen, a user interface screen, or a screen corresponding to an event occurrence.

The user interface 640 receives an input of a request, an instruction, or other data from a user.

The user interface 640 may be a touch screen. For example, the user interface 640 may include a touch pad (not shown) which is combined with a display panel (not shown). When the user interface unit 640 is the touch screen, the user interface unit 640 may output, on the display panel that is combined with the touch pad, a menu screen that is a user interface screen. When the user touches a pre-determined point on the menu screen, for example, a point in which a mirroring service menu is displayed, the user interface 640 senses the touched point. Then, the user interface 640 may transfer the sensing information to the controller 620. The battery 650 includes a rechargeable battery and supplies power to each component of the master device 600.

The memory 660 may store various data, programs needed for operations of the master device 600, applications, and data transferred and received.

Figure 7:
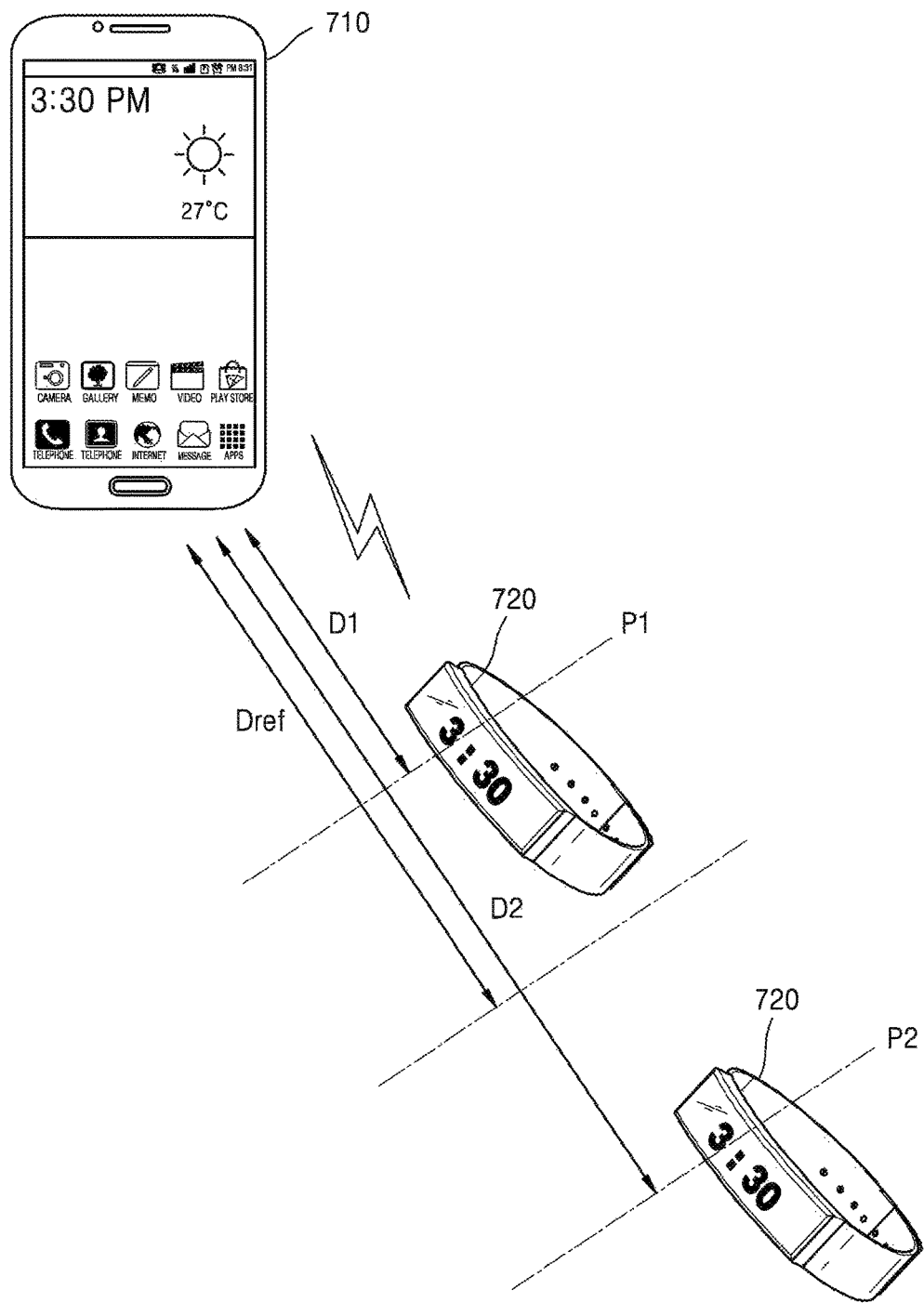
FIG. 7 is a view for describing an operation of a wearable device, according to an exemplary embodiment.

FIG. 7 is a view for describing an operation of a wearable device 720 according to an exemplary embodiment. A master device 710 and the wearable device 720 illustrated in FIG. 7 respectively correspond to the master device 600 and the wearable device 300, and thus, repeated descriptions with respect to FIGS. 3 and 6 will be omitted.

Referring to FIG. 7, the master device 710 may stop or re-start data transferring and receiving according to a distance between the master device 710 and the wearable device 720. For example, when the distance between the wearable device 720 and the master device 710 is equal to less than a first reference distance Dref, the master device 710 may continue data transferring, and when the distance between the wearable device 720 and the master device 710 is higher than the first reference value Dref, the master device 710 may discontinue the data transferring. Also, when the data transferring is discontinued, the master device 710 may re-start the data transferring if the distance between the wearable device 720 and the master device 710 is equal to or lower than the first reference distance Dref. For example, if the wearable device 720 is located at a point P1 which is apart from the master device 710 by a first distance D1, the master device 710 may retain data transferring to the wearable device 720. Also, if the wearable device 720 is located at a point P2 which is apart from the master device 710 by a second distance D2, the master device 710 may retain data transferring to the wearable device 720. Here, the distance between the master device 710 and the wearable device 720 may be measured based on the RSSI, and the first reference distance Dref may be a distance corresponding to the first reference value −70 dBm.

Figure 8:
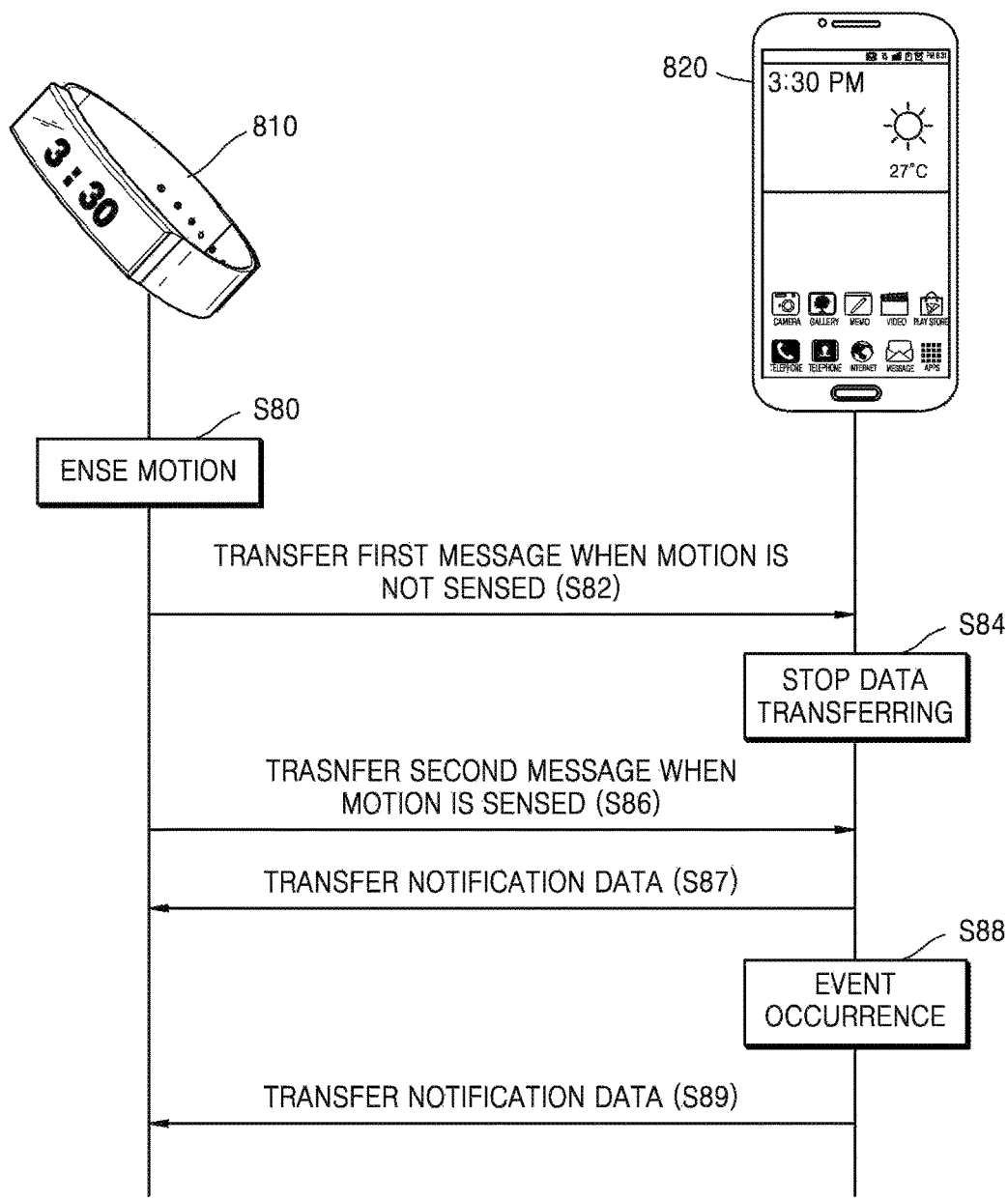
FIG. 8 is a view for describing an operation of a wearable device and a master device, according to an exemplary embodiment.

FIG. 8 is a view for describing operations of a wearable device 810 and a master device 830 according to an exemplary embodiment. In FIG. 8, the wearable device 810 and the master device 830 correspond to the wearable device 300 and the master device 600, and thus, repeated descriptions with respect to FIGS. 3 and 6 will be omitted. Also, hereinafter, components of the wearable device 810 will be described by referring to the components of the wearable device 300 of FIG. 3, and components of the master device 820 will be described by referring to the components of the wearable device 600 of FIG. 6.

Referring to FIG. 8, the sensor 330 of the wearable device 810 senses motion and transfers the sensing data that is a result of the sensing to the controller 340.

The controller 340 of the wearable device 810 may control a first message requesting a stop of data transferring such that the first message is transmitted to the master device 820, when motion of a user is not sensed for a predetermined duration (e.g., one hour).

Referring to FIG. 8, the sensor 330 of the wearable device 810 senses the motion of the user in operation S80. The controller 340 receives the sensing result and logs the sensing result. When the motion of the user is not sensed for the predetermined duration (e.g., one hour), the controller 340 transmits the first message requesting the stop of data transferring to the master device 820 in operation S82.

Accordingly, the communicator 610 of the master device 820 receives the first message and transfers the first message to the controller 620. The controller 620 stops the data transferring to the wearable device 810 in operation S84. For example, if the first message is received, the master device 820 does not transfer notification data notifying an event occurrence to the wearable device 810, even when the event such as receipt of an email, a text message, or a chat-on message occurs in the master device 820.

If the motion of the user is sensed via the sensor 330 of the wearable device 810, the controller 620 transmits a second message requesting a re-start of data transferring to the master device 820 in operation S86.

When the second message is received, the master device 820 may transfer the notification data which is not transferred to the wearable device 810 due to the stop of data transferring S84 to the wearable device 810 in operation S87. When the notification data is received in operation S87, the wearable device 810 may display a notification screen corresponding to the notification data.

Also, when a new event occurs in the master device 820 in operation S88, the communicator 610 of the master device 820 transfers notification data corresponding to the new event to the wearable device 810 in operation S89. Also, when the notification data is received in operation S89, the wearable device 810 displays a notification screen corresponding to the received notification data.

When the user is not using the wearable device 810, (e.g., when the user is not wearing the wearable device 810 or is asleep), the user may not view the notification even if the display 320 displays the notification screen. Thus, when the motion of the user is not sensed because the user is not using the wearable device 810 as described above, the wearable device 810 may stop the data transferring and receiving and maintain a display-off state thereby reducing power consumption due to data transferring and receiving and displaying of the notification screen.

Figure 9:
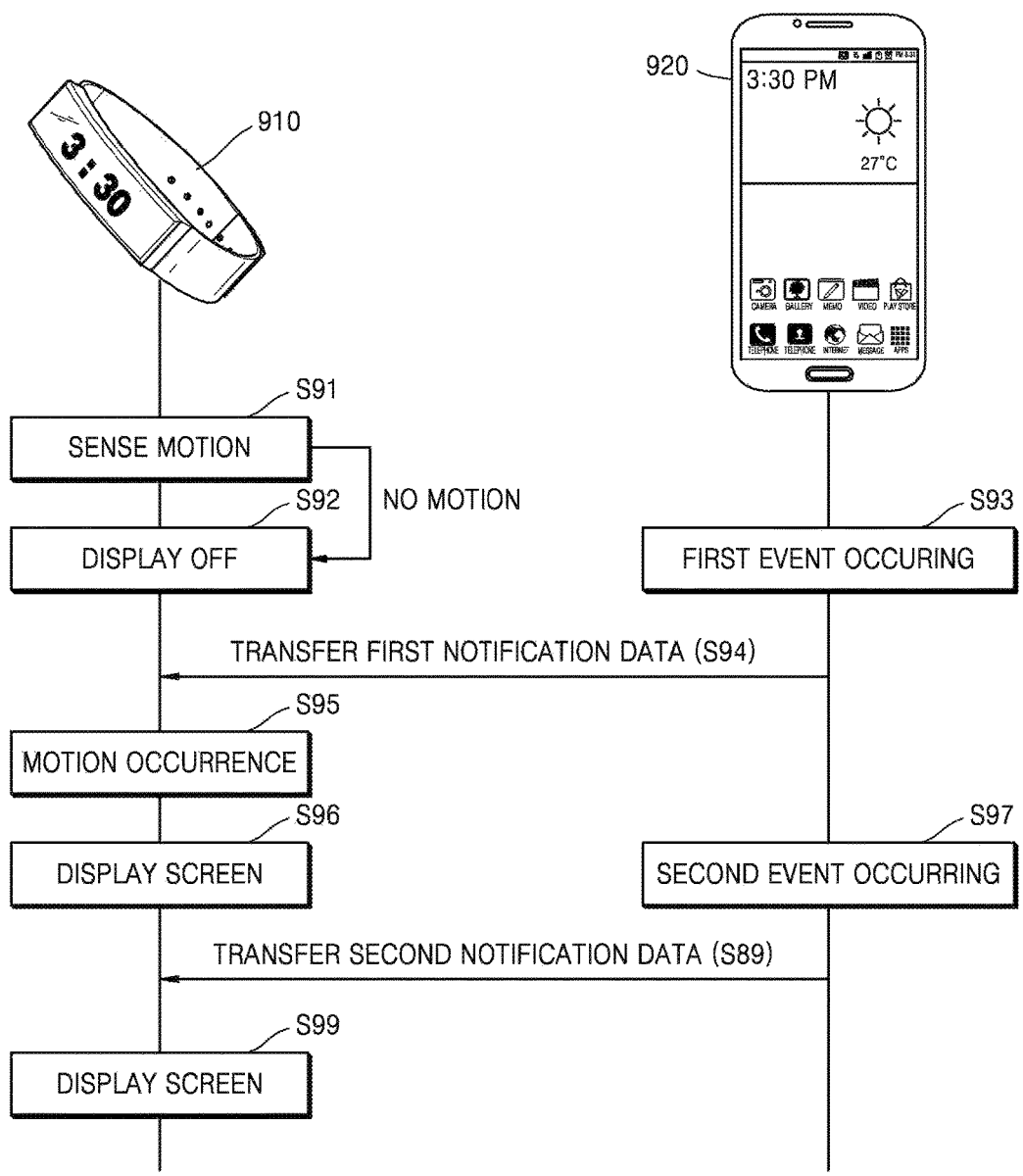
FIG. 9 is a view for describing an operation of a wearable device and a master device, according to an exemplary embodiment.

FIG. 9 is a view for describing operations of a wearable device 910 and a master device 920 according to an exemplary embodiment. In FIG. 9, the wearable device 910 and the master device 920 respectively correspond to the wearable device 300 and the master device 600, and thus, repeated descriptions with respect to FIGS. 3 and 6 will be omitted. Also, hereinafter, components of the wearable device 910 will be described by referring to the components of the wearable device 300 of FIG. 3, and components of the master device 920 will be described by referring to the components of the master device 600 of FIG. 6.

Referring to FIG. 9, the sensor 330 of the wearable device 910 senses motion of a user in operation S91.

When it is determined that there is no motion of the user, based on a result of the sensing of the sensor 330, the controller 340 of the wearable device 910 controls the display 320 such that the display 320 turns off a display in operation S92.

When the display of the wearable device 910 is turned off in operation S92, a notification screen corresponding to an event is not displayed, even when the event occurs in the master device 920. In detail, when a first event occurs in the master device 920, the communicator 350 of the master device 920 transfers first notification data notifying the occurrence of the first event to the communicator 350 of the wearable device 910 in operation S94. However, because the wearable device 910 maintains the display-off state S92, the wearable device 910 does not display a notification screen corresponding to the first notification data, even when the first notification data is received. Also, the memory 370 of the wearable device 910 may store the first notification data.

Thereafter, when the motion of the user is sensed, as a result of the sensing of the sensor 330 of the wearable device 910, in operation S95, the display 320 displays a screen in operation S96. That is, when the motion of the user occurs in operation S95, the display 320 is converted from the display-off state to a display-on state.

When the motion of the user occurs in operation S95, the controller 340 controls the display 320 such that the display 320 displays the notification screen corresponding to the first notification data that is previously received and stored in the memory 370, in operation S96.

Also, when a second event that is a new event occurs in the master device 920, in operation S97, the communicator 610 of the master device 920 transfers second notification data corresponding to the second event to the wearable device 910 in operation S89. Because the wearable device 910 maintains the display-on state, the display 320 of the wearable device 910 displays a notification screen corresponding to the second notification data, in operation S99.

When the user is not using the wearable device 910, such as when the user is not wearing the wearable device 910 or is asleep, the user may not view the notification, even if the display 320 displays the notification screen. Thus, when the motion of the user is not sensed since the user is not using the wearable device 910 as described above, the wearable device 910 may maintain the display-off state, in order to reduce power consumption generated by displaying of the notification screen.

Figure 10:
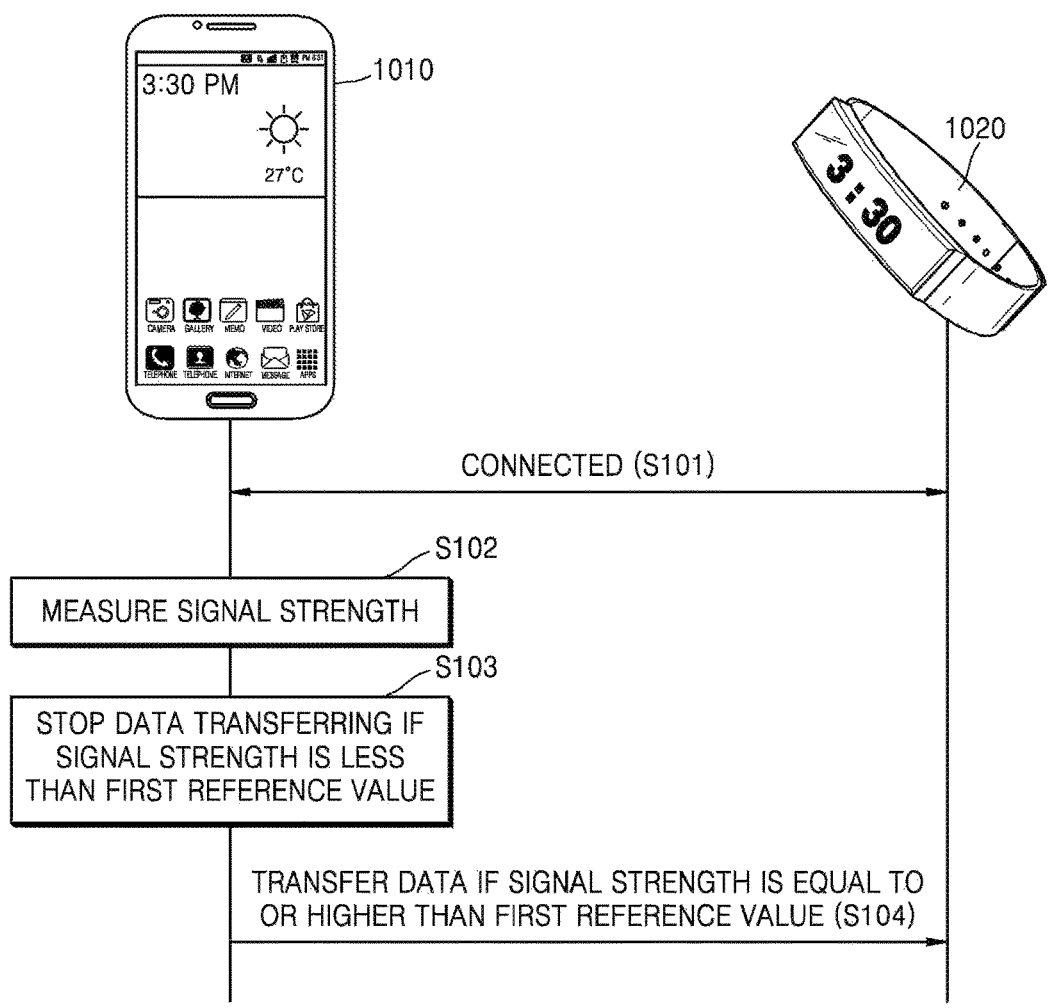
FIG. 10 is a view for describing an operation of a wearable device and a master device, according to an exemplary embodiment.

FIG. 10 is a view for describing operations of a wearable device 1020 and a master device 1010 according to an exemplary embodiment. In FIG. 10, the wearable device 1020 and the master device 1010 respectively correspond to the wearable device 300 and the master device 600, and thus, repeated descriptions with respect to FIGS. 3 and 6 will be omitted.

The controller 620 of the master device 1010 may stop data transferring to the wearable device 1020, when the RSSI is less than a first reference value.

Referring to FIG. 10, the master device 1010 and the wearable device 1020 maintain a connected state in operation S101. The Bluetooth module 615 of the master device 1010 measures a strength of a signal received from the wearable device 1020, in operation S102. The Bluetooth module 615 of the master device 1010 may monitor the strength of the signal periodically received from the wearable device 1020 in a pre-determined time interval. Alternatively, the Bluetooth module 615 of the master device 1010 may measure a signal strength of received data whenever data is received from the wearable device 1020.

If the RSSI of the data received from the wearable device 1020 is less than the first reference value, the controller 620 may stop data transferring to the wearable device in operation S103. Here, the first reference value may vary according to specifications of the Bluetooth module 615.

Next, if the RSSI is equal to or higher than the first reference value, as a result of the measuring of the signal strength in operation S102, the controller 620 of the master device 1010 may re-start data transferring to the wearable device 1020. Accordingly, when an event occurs in the master device 1010, the communicator 610 of the master device 1010 transfers notification data corresponding to the event to the wearable device 1020 in operation S104.

Figure 11:
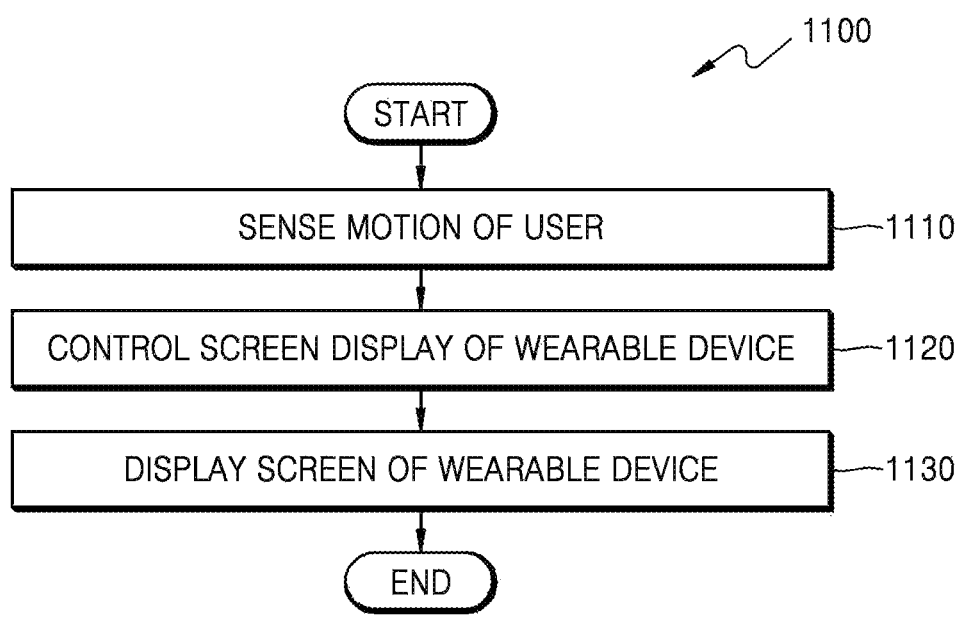
FIG. 11 is a flowchart illustrating a method of controlling a wearable device, according to an exemplary embodiment.

FIG. 11 is a flowchart illustrating a method 1100 of controlling a wearable device, according to an exemplary embodiment. The method 1100 may be executed by using the wearable devices (for example, the wearable device 300) according to the exemplary embodiments of the inventive concept. Also, the method 1100 includes the same operations as the operations of the wearable devices (for example, the wearable device 300) according to the exemplary embodiments, and thus, repeated descriptions with respect to the wearable devices (for example, the wearable device 300) according to the exemplary embodiments will be omitted. Also, the method 1100 will be described with reference to the wearable device 300 of FIG. 3.

Referring to FIG. 11, the method 1100 includes sensing motion of a user via the wearable device 300 that is wearable on a body of the user, in operation S1110. The operation of S1110 may be performed by the sensor 330 of the wearable device 300.

Based on a result of the sensing of the motion in operation S1110, whether or not to display a screen of the wearable device 300 is determined in operation S1120. The operation S1120 may be performed by the controller 340 of the wearable device 300. The controller 340 of the wearable device 300 may determine whether the user is looking at the screen, based on the result of the sensing of the motion via the sensor 330, and when it is determined that the user is not looking at the screen, may determine not to display the screen.

Also, the screen of the wearable device 300 is displayed in operation S1130 according to the determination of the operation S1120. The operation S1130 may be performed by the display 320 according to a control of the controller 340 of the wearable device 300. The operation S1130 includes turning off a display via the display 320 and not displaying the screen, when it is determined not to display the screen in operation S1120. Also, the operation S1130 includes turning on the display via the display 320 and displaying the screen, when it is determined to display the screen.

As described above, according to the o above exemplary embodiments, the on and off state of the display of the wearable device may be controlled according to the motion of the user, and thus, power consumption of the wearable device may be reduced. Also, by reducing the power consumption, usage time of the wearable device may be increased without increasing a battery capacitance.

One or more programs including commands for performing a method of controlling a screen editing of a display according to the one or more exemplary embodiments of the present invention may be embodied as computer-readable codes on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown in described above, it will be understood by those of ordinary skill in the art that various changes in form and details may be made herein without departing from the spirit and scope of the inventive concept as defined by the following claims.

What is claimed is:

1. A wearable device that is wearable on a body of a user, the wearable device comprising:
    a display configured to display a screen;
    a communicator configured to transfer and receive data to and from a master device;
    a sensor configured to sense a motion of the user; and
    a controller configured to:
        obtain sensing data at a motionless point corresponding to a first point when the motion of the user stops, by determining a first variation of acceleration between the motion of the user at a second point prior to the motionless point and the motion of the user at the motionless point in a forward-rear direction of the user and by determining a sum of a second variation of acceleration at the motionless point in a left-right direction of the user and a third variation of acceleration at the motionless point in an up-down direction of the user,
        determine whether the user is looking at the screen using the sensing data at the motionless point,
        control the display based on the sensed motion,
    wherein the controller is further configured to transmit a first message to the master device to request the master device to stop transfer of the data to the wearable device based on the sensor sensing that the user has not moved for a first duration.

2. The wearable device of claim 1, wherein the sensing data at the motionless point for determining that the user is looking at the screen of the wearable device is determined based on an acceleration variation value from the second point prior to the motionless point to the motionless point by using at least one acceleration variation regarding at least one direction.

3. The wearable device of claim 1, wherein the controller is configured to transmit a second message to the master device to request the master device to restart the transfer of the data to the wearable device based on the sensor sensing a user motion after the controller transmitting the first message.

4. The wearable device of claim 1, wherein the controller is configured to control the display to not display a notification screen corresponding to the data transferred from the master device based on the sensor sensing that the user has not moved for the first duration.

5. The wearable device of claim 1, wherein:
the controller is configured to determine whether the user is looking at the screen based on the sensed motion, and based on the controller determining that the user is not looking at the screen, the controller is configured to control the display to not display the screen.

6. The wearable device of claim 1, wherein:
the controller is configured to determine whether the user is looking at the screen based on the sensed motion, and based on the controller determining that the user is looking at the screen, the controller is configured to control the display to display the screen.

7. The wearable device of claim 1, wherein the controller is configured to control the display to not display the screen, based on the sensed motion comprising a first motion corresponding to the user raising a wrist sequentially followed by a second motion corresponding to the user lowering the wrist.

8. The wearable device of claim 7, wherein the controller is configured to control the display to display the screen based on the sensor sensing the first motion and configured to control the display to not display the screen based on the sensor sensing the second motion.

9. The wearable device of claim 1, wherein the controller is configured to control the display to not display the screen, in response the sensed motion comprising a first motion corresponding to the user turning a wrist in a first direction sequentially followed by a second motion corresponding to the user turning the wrist in a second direction different from the first direction.

10. The wearable device of claim 1, wherein the controller is configured to control the display not to display the screen, based on the sensed motion indicating that the user is walking.

11. The wearable device of claim 1, wherein the controller is configured to control the display to not display the screen, based on the sensed motion indicating that the user is running.

12. The wearable device of claim 1, wherein the controller is configured to control the display to not display the screen, based on the sensed motion indicating that the wearable device is not provided on the user.

13. The wearable device of claim 1, wherein the controller is configured to determine that the user is looking at the screen based on the first variation of acceleration being in a range between −3 m/s2 and 3 m/s2.

14. The wearable device of claim 13, wherein the controller is configured to determine that the user is looking at the screen based on the sum being greater than or equal to 5 m/s2.

15. The wearable device method of claim 14, wherein the determining further comprises determining that the user is looking at the screen based on the sum being greater than or equal to 5 m/s2.

16. A method of controlling a wearable device that is wearable on a body of a user, the method comprising:
communicating with a master device to transfer and receive data;
sensing a motion of the user;
obtaining sensing data at a motionless point by determining a first variation of acceleration between the motion of the user at a second point prior to the motionless point and the motion of the user at the motionless point in a forward-rear direction of the user and by determining a sum of a second variation of acceleration at the motionless point in a left-right direction of the user and a third variation of acceleration at the motionless point in an up-down direction of the user;
determining whether the user is looking at a screen of the wearable device by using the sensing data at the motionless point corresponding to a first point where the motion of the user stops; and
displaying the screen on the wearable device based on the determination,
transmitting a first message to the master device to request the master device to stop transfer of the data to the wearable device based on sensing that the user has not moved for a first duration.

17. The method of claim 16, wherein the sensing data at the motionless point for determining that the user is looking at the screen of the wearable device is determined based on an acceleration variation value from the second point prior to the motionless point to the motionless point by using at least one acceleration variation regarding at least one direction.

18. A non-transitory computer-readable storage medium having a program stored thereon for executing a method comprising:
communicating with a master device to transfer and receive data;
sensing a motion of a user;
obtaining sensing data at a motionless point by determining a first variation of acceleration between the motion of the user at a second point prior to the motionless point and the motion of the user at the motionless point in a forward-rear direction of the user and by determining a sum of a second variation of acceleration at the motionless point in a left-right direction of the user and a third variation of acceleration at the motionless point in an up-down direction of the user;
determining whether the user is looking at a screen of a wearable device, by using the sensing data at the motionless point corresponding to a first point where the motion of the user stops; and
displaying the screen on the wearable device based on the determination,
transmitting a first message to the master device to request the master device to stop transfer of the data to the wearable device based on sensing that the user has not moved for a first duration.

* * * * *